Oct. 25, 1949.    C. I. PLACE    2,485,770
WHEEL AND FRAME ASSEMBLY
Filed May 14, 1947

INVENTOR;
CHARLES I. PLACE
BY Robert B. Terry
ATTORNEY

Patented Oct. 25, 1949

2,485,770

UNITED STATES PATENT OFFICE 2,485,770

WHEEL AND FRAME ASSEMBLY

Charles I. Place, Norfolk, Conn.

Application May 14, 1947, Serial No. 747,897

15 Claims. (Cl. 280—106.5)

1

This invention relates to improvements in wheel and frame assemblies for road vehicles, particularly vehicles of self-propelled or automotive character, and has reference to improvements in the relative arrangement of the wheels and body frame or chassis, and in the manner of wheel-suspension of the latter, such as will afford a vehicle having among other advantages hereinafter appearing, markedly improved riding and maneuverability characteristics.

It is well known in connection with automotive vehicles of conventional types, that the riding qualities of such vehicles may be improved perceptibly, by increasing the vehicle wheel-base within limits set by practical considerations, and by avoiding as far as possible in view of the limitations inherent in the conventional type vehicle, location of any seat structure substantially over one or another of the wheel axles. While passenger riding comfort in conventional vehicles may be enhanced in this way, the increased wheel-base results in a corresponding increase in the turning radius of the vehicle, and moreover, generally requires a correspondingly greater over-all vehicle length. Consequently, better riding qualities are thus obtainable only at the expense of increased vehicle length, space requirements, and appreciably lessened maneuverability not only in road travel, but in parking within restricted spaces.

Accordingly, it is the principal object of the present invention to provide an improved road vehicle wherein the ground engaging wheels and the body frame or chassis are so relatively arranged, and the wheel support of the chassis is of such improved character, as to secure in a single vehicle the advantages of both short and long wheel-base vehicles, including greatly enhanced riding comfort and vehicle maneuverability. In attaining this end, the present improvements provide a relatively long effective wheel-base without requiring or necessitating a corresponding increased over-all length of the vehicle as such would obtain in the conventional form of road vehicle, so that a vehicle body of appreciably shorter over-all length yet of ample interior space, may be utilized with the present novel wheel and chassis assembly.

Another object is to provide an improved road vehicle of the character indicated, wherein the wheel-support or suspension of the chassis is effected in a novel manner and in a zone of the chassis effectively remote from the road wheels, whereby chassis reaction to wheel-transmitted road shocks and other deleterious effects of road

2 travel, is reduced to a minimum, such that markedly improved riding comfort is attained at all points along the chassis.

A further object is to provide a four wheeled road vehicle providing an improved wheel arrangement and an improved wheel-suspension of the vehicle body frame, such as will afford a lift of the body frame to increase road clearance thereof, under conditions of road travel along steeply crowned roads and those unevenly worn to a marked extent or relatively deeply rutted.

Yet another object is to provide a road vehicle of improved character as hereinabove indicated, wherein the wheel and chassis assembly while attaining the advantages above enumerated, may be utilized with vehicle bodies of conventional forms as well as those of streamlined character, and further wherein the improved assembly is well suited to vehicles designed for travel selectively in the air or on the ground.

Additional objects and advantages will appear readily from the following description of a presently preferred embodiment of the invention as illustrated in the accompanying drawing, wherein.

Figure 1:
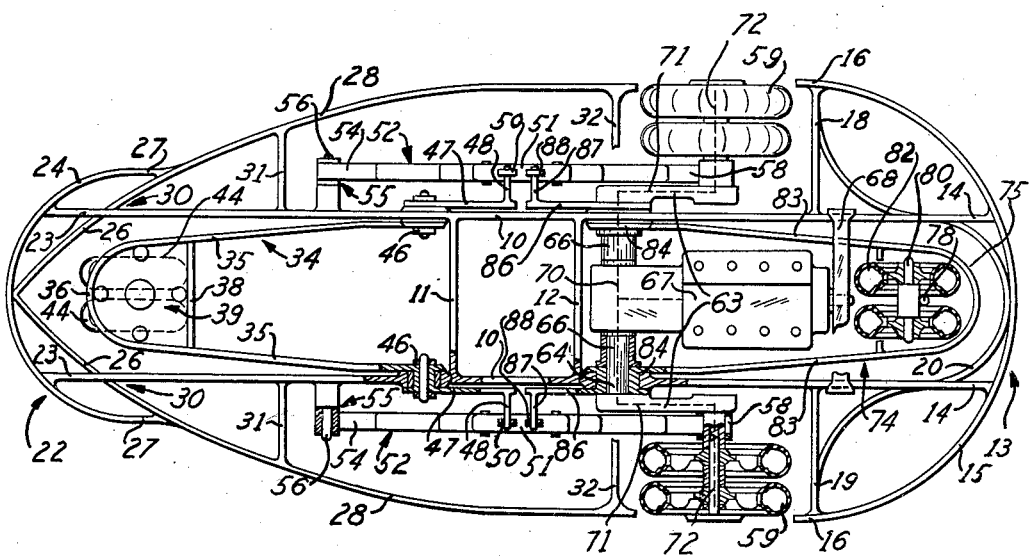
Fig. 1 is a view in plan elevation, of a wheel and chassis assembly embodying the present improvements, certain parts being shown in section for clearness.
Figure 2:
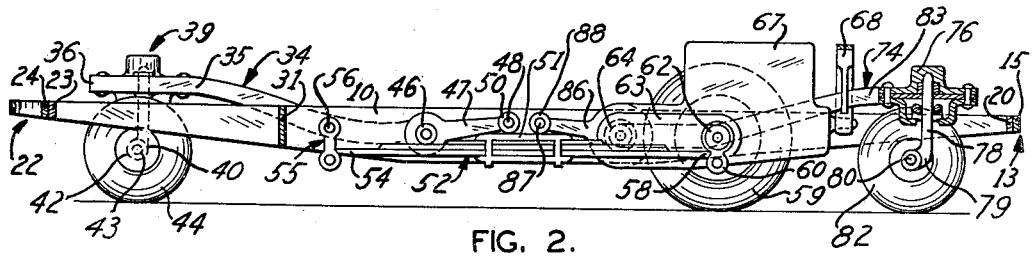
Fig. 2 is a longitudinal side elevation of the assembly, certain of the outer frame elements being broken away, and other elements shown in section for clearness of illustration.

With reference to the drawing, there is shown a vehicle wheel and chassis assembly embodying the present improvements, which for the purpose of present example, is illustrated as adapted for a streamlined or so-called "tear-drop" vehicle body. The chassis as appears, is comprised of a central longitudinal frame provided by relatively spaced, horizontal frame members or sills 10 substantially coextensive with the over-all length of the chassis, the sills being rigidly connected by relatively spaced cross pieces 11 and 12 in the central zone of the frame. At the forward end 13 of the chassis, the ends 14 of the sills 10 are rigidly joined by an arcuate or semi-circular bar or frame member 15, the latter extending laterally and rearwardly of the forward end 13 on each side thereof, to termination at 16. Supporting the lateral extensions of the bar 15 are braces 18 and 19 suitably attached to the sills 10, while reinforcing the bar in its connection of the sill ends 14, is a further brace element 20. At the rear end 22 of the chassis, the ends 23 of the sills 10 are similarly rigidly joined by an arcuate or semi-circular bar 24 of smaller radius than that of bar 15, bar 24 being reinforced by brace elements 26. Each end portion 27 of bar 24 extends laterally on the outer side of the adjacent sill end 23 and is joined to a smoothly curved side frame member 28 directly connected to the sill at 30. The side frames are further supported on the sills by braces 31 and 32.

In the space afforded between the sills 10, the cross-piece 11 and the rear end 22 of the chassis, is arranged an auxiliary or wheel-carriage frame 34 providing opposite longitudinal arms 35 joined at the end 36 inwardly adjacent the chassis rear end, the joined ends being braced by a transverse member 38. Carried by the frame end 36 and brace 38 is a support and journal bearing assembly 39 of suitable construction, providing for swivel support of a wheel-stand member 40 vertically depending therefrom and having rotatably journalled in its lower end 42, the axle 43 of a vehicle ground wheel 44. As presently shown and preferred, wheel 44 is of a divided or double-wheel character, while the member 40 is adapted for wheel axle support such that the axis thereof is somewhat displaced from intersection with the vertical axis of the member. It thus appears that the wheel 44 and its operative support constitute in effect, a caster wheel assembly.

The arms 35 of the wheel-frame 34 extend to rigid connection with pivot elements 46 pivotally carried by the sills 10 adjacent the cross piece 11, each arm being extended on the outer side of the adjacent sill, by an extension element or lever arm 47 rigid with the pivot element 46 and directed toward the central transverse axis of the chassis. Each lever arm 47 provides a lateral projection 48 supporting a roller 50 at its free end, the roller engaging and bearing upon a plate 51 on the top center of a relatively long leaf spring assembly 52, one arranged along each sill 10. One end 54 of each spring is supported by a spring shackle device 55 which may be of usual construction, pivoted to a projection 56 of the adjacent chassis sill 10, the sill projection being located rearwardly of the wheel-frame pivot 46. Each spring at its forward end 58, is supported by a vehicle ground wheel 59, preferably of a double-wheel type, located laterally of the adjacent chassis sill and in the space afforded therefor between the terminal ends of the body frame parts 15 and 28. Preferably, the spring end 58 is wheel-supported by a shackle 60 mounted on the axle housing 62 of the wheel 59. The ground wheels 59 located as indicated, in relatively spaced relation transversely of the chassis, are by present preference, independently pivotally connected with the chassis each by an arm 63 extending from the inner end of the axle housing 62 generally along the adjacent sill 10 to pivotal connection with end 64 of a member 66 extending transversely between and through the side sills 10 just forwardly of the chassis cross-piece 12.

While the vehicle embodying the present improvements may be a non-self-propelled or trailer unit, for the purpose of present example, the vehicle illustrated is self-propelled, with the wheels 59 constituting the powered or drive wheels. Accordingly, there is shown at 67 a suitable power plant which may be an internal combustion engine of any well known or desired construction, carried on the chassis by the member 66 and a yoke-like bracket 68 secured to the side sills 10. Member 66 preferably is a casing structure which may house the usual speed-change mechanism (not shown) and a transversely extending power shaft indicated in broken lines at 70. Each wheel arm 63 also is of hollow construction by present preference, to enclose suitable drive means indicated by the broken line 71, between one end of shaft 70 and the inner end of the wheel axle 72. Any well known or suitable drive mechanism between the engine and drive-wheel shafts 72, may be employed as desired, since such is of no particular concern to the present invention.

An auxiliary or wheel carriage frame 74 similar to auxiliary frame 34, is arranged in the space provided between the side sills 10, cross piece 12 and the forward end 13 of the chassis. At its forward end 75, the frame 74 carries a support and journal bearing assembly 76 affording swivel support of a wheel stand or axle-support member 78 depending therefrom and connected at its lower end 79, to the axle 70 of a ground wheel 82. Wheel 82 like the rear wheel 44, is of double-wheel character, while the lower end 79 of member 78 is turned outwardly from the vertical axis of the latter, so that the wheel and its stand constitute what may be termed a caster wheel assembly. It is to be noted as for a purpose to appear, that the turned end 79 projects to a greater extent than does the turned end 42 of stand 40.

Wheel-carriage frame 74 includes spaced arms 83 each of which extends to rigid connection with a pivot element 84 mounted in the chassis sill 10 in concentric or co-axial relation to the member 66 in its projection through the sill. Each arm 83 is extended on the outer side of the sill, by an extension or lever arm 86 rigid with pivot element 84 and extending toward the central transverse axis of the chassis. A lateral projection 87 at the free end of each lever arm 86, carries a roller 88 which engages and bears upon the plate 51 of the spring assembly 52, at a point thereon relatively near the roller 50 of wheel-frame 34.

Like the wheel frame 34, wheel frame 74 is thus mounted to the body frame for pivotal movement relative thereto. Since the vehicle power unit or engine 67 is located between the opposite sides of the frame 74 as appears in the present example, the bracket 68 supporting the forward end of the engine, is arched upwardly over the frame 74 to an extent as indicated, sufficient to avoid any interference thereby with the upward movements of the frame 74 relative to the main frame members 10.

Figure 3:
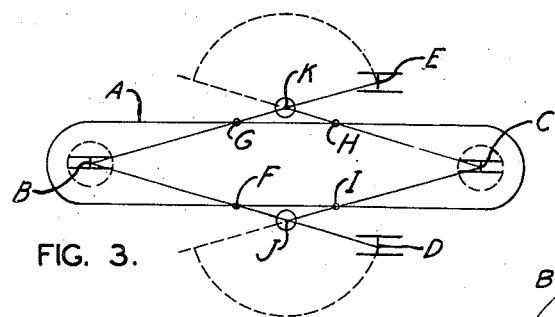
Fig. 3 is a diagrammatic illustration of the wheel span and chassis suspension relationship obtaining as a result of the present improvements.

From the foregoing description of the wheel-chassis assembly as illustrated, it will appear that the caster wheels 44 and 82 are located inwardly near the opposite ends of the chassis and in the longitudinal axis of the latter, while the ground wheels 59 which may be of greater diameter as shown, are spaced transversely of the chassis and located with respect to the longitudinal extent of the chassis, between the forward caster wheel 82 and the chassis frame cross-piece 12. Moreover and in accordance with the present improvements, the wheel-chassis assembly as described, is such that the wheel spans between the rear caster wheel 44 and the wheels 59 are equal to each other, and further, are substantially equal to the effective wheel spans obtaining between the forward caster wheel 82 and the wheels 59. This relationship is shown diagrammatically in Fig. 3, wherein A is the chassis; B the rear caster wheel; C the forward caster wheel; D and E the wheels 59; F and G the points of pivotal connection between the chassis and auxiliary frame 34 (pivots 46); H and I the points of pivotal connection between the chassis and auxiliary frame 74 (pivots 84), and J and K the zones of roller engagement of the auxiliary frames with the spring assemblies 52. In the figure, lines B—F—J—D and B—G—K—E representing wheel spans between wheel B—D and B—E, are of equal extent, and are substantially equal to the wheel spans C—I—J—D and C—H—K—E, the latter representing the effective wheel spans between wheels C—D and C—E. Furthermore, the points of pivotal connection between the chassis and the auxiliary or wheel-carriage frames, as the points F, G, H and I, are determined in the construction shown, such that each is at substantially the mid-point of the associated wheel span. Consequently, since these four points represent the sole effective points of wheel-suspension of the vehicle chassis, and each is mid-way of its related wheel span, the vehicle chassis thus is supported in zones least affected by road shocks transmitted through the wheels. Accordingly, the improved character of chassis support which, as appears, is essentially of the double-cantilever type affording over-hanging end portions of the chassis frame, provides a fully resilient suspension of the chassis such that the latter is least affected by or subject only to a minimum degree, to road shocks and other deleterious effects attending road travel. Passenger seating thus may be distributed over the chassis with assurance of substantially equal riding comfort at all points.

A further important advantage of the present improvements, obtains in the wheel span arrangement attending the wheel and chassis assembly as here shown. As hereinabove described in connection with the diagrammatic view of Fig. 3, the wheel span between the rear caster wheel and each of the intermediate drive wheels, is equal or substantially so, to the wheel span between the forward caster wheel and each drive wheel, from which it will appear that each span is appreciably less than the overall length of the chassis. This introduces the advantages of a relatively short wheel-base vehicle in respect to space requirements and short turning radius, affording thereby greatly enhanced maneuverability of the vehicle in road travel as well as in parking. Additionally, the wheel-span arrangement in conjunction with the present novel character of chassis suspension, provides in effect, a relatively long wheel-base, and hence secures the advantages of enhanced riding comfort, but without requiring a correspondingly increased overall length of vehicle body as would be required in the instance of the conventional type of vehicle, consequent to increase in wheel-base length of the latter. It is to be repeated and emphasized here, that the present manner of chassis suspension affords substantially equal riding comfort in any and all positions along the chassis, which thus facilitates any desired seating arrangement in the vehicle body.

Further by reason of the present improvements in chassis suspension, the side sills 10 of the chassis frame may be relatively straight or rectilinear spans as shown, with the top surfaces thereof substantially planar or level throughout. Thus is avoided any requirements for vertical curving or other angular shaping of any portion thereof as obtains in conventional vehicle constructions, in order to clear the axle structure of the drive or rear wheels. The present arrangement moreover, is well suited to the mounting of streamlined vehicle bodies providing a maximum of useful interior space, and additionally, may be readily employed in a vehicle adapted for both air and road travel, as those having retractible or detachable wings which are extended in operative position for flight, and folded or detached when road travel is desired.

According to the presently preferred embodiment of the invention, the drive wheels 59 are independently mounted in pivotal relation to the chassis, as through the pivot arms 63, this contributing materially to the adaptation of the assembly for the employment of a chassis presenting a level bed-frame. However, the invention is not limited to independent drive-wheel support as shown, since the improvements now effected, will obtain in a similar construction modified to effect operative connection of the drive wheel shafts 72 in axial alignment, as through the usual differential mechanism.

Vehicle steering is here effected by preference, through the rear caster wheel 44, as by suitable steering mechanism (not shown). While the forward caster wheel 82 may be utilized conjointly with wheel 44, in vehicle steering, it is here shown as being supported for free turning about its vertical axis, and hence acts as a free guide wheel in vehicle turning. The extent of off-set of its wheel axle from the vertical axis of the axle stand 78, facilitates this function of the wheel to a marked degree. Moreover, the degree of caster or off-set of the forward wheel 82 which is greater than that of the rear wheel 44 as hereinbefore stated, serves an additional and important purpose in the present invention. When the vehicle is turned from a straight line travel, effected in the present embodiment by turning the rear wheel 44 in the direction opposite to the desired direction of vehicle turning, the forward wheel 82 pivoting about its supporting axis in the turning direction of the vehicle, becomes angularly displaced from the longitudinal vehicle axis, oppositely to the displacement of wheel 44 and outwardly with respect to the center or axis of vehicle turning. Being of greater caster, the forward wheel thus has its point of ground contact displaced laterally with respect to the longitudinal axis of the vehicle, to a correspondingly greater extent than obtains at wheel 44, with the result that a greater portion of the total vehicle weight then appears between the points of ground contact of the caster wheels and the near side of the vehicle with respect to the center of turning. Consequently, the effective unbalance of the vehicle weight in the direction indicated with respect to the caster wheels, will tend to oppose or counteract the centrifugal force acting on the vehicle in opposition to vehicle turning. Thus, considering a vehicle assembly of given weight and with due regard to normal maximum vehicle loading, it now will appear that by predetermining the degree of caster or off-set of the wheel axes of wheels 44 and 82, with the latter off-set to a predetermined greater degree, the action of centrifugal force in vehicle turning may be effectively counteracted. Accordingly, the safety and ease of vehicle turning are markedly enhanced by the foregoing provision.

It is to be noted in the presently illustrated form of the invention, that but a single pair of spring assemblies 52 are utilized in chassis suspension, this number being entirely sufficient for the purpose and contributing to simplification of structure. Nevertheless, a pair of springs may be arranged at each side of the chassis, to provide individual support of the wheel-carriage rollers 50 and 88, should this be desired. Also, while leaf spring assemblies are shown, coil springs may be employed in supporting relation to the rollers, as by mounting the springs below the rollers on a cross-piece pivoted to the chassis and drive wheel axle housing in the manner provided for the leaf springs illustrated.

In road operation of the presently improved vehicle, the road clearance of the chassis will be appreciably greater than obtains with the conventional vehicle, when traveling along steeply crowned roads or on relatively deeply rutted roads. In the first case, the forward and rear caster wheels traveling on a plane above the plane or planes of drive wheel travel, will cause a relative lift of the chassis, as with respect to the axes of the drive wheels.

While the invention is herein illustrated in a partly schematic manner, leaving open to design selection specific details of certain structural parts of the assembly, the present disclosure is considered to be fully adequate to a complete understanding of the principles of the invention. It is to be understood, however, that the arrangement of parts and manner of chassis suspension as shown, may be modified without departing from the spirit and full intended scope of the invention defined by the appended claims.

I claim:

1. In a road vehicle, a body frame, a pair of ground wheels each connected to said frame, yieldable means connected between said frame and said ground wheels, wheel-supporting frames each pivoted to said body frame and extending to supported engagement with said yieldable means, and a ground wheel on each of said wheel-supporting frames.

2. A wheel and frame assembly for road vehicles, comprising a main frame including relatively spaced longitudinal frame members, ground wheels spaced transversely of the frame and pivotally connected to said frame members, yieldable members connected to said frame members and to said ground wheels, auxiliary frame means pivoted to the main frame and bearing against said yieldable members, said auxiliary frame means extending substantially longitudinally of the main frame and terminating near the opposite ends of the latter, and ground wheels supported at the terminal ends of the auxiliary frame means.

3. A wheel and chassis assembly for vehicles of the character indicated, comprising a chassis structure providing longitudinal frame members, ground wheels each arranged laterally adjacent one of said frame members and pivotally connected thereto, yieldable members supported between said frame members and ground wheels, auxiliary frames pivoted to said chassis frame members and bearing upon said yieldable members, one of said auxiliary frames being directed substantially longitudinally of the chassis between said frame members and terminating near one end of the chassis, a ground wheel supported at the terminal end of said one auxiliary frame, and a ground wheel supported on another of the auxiliary frames.

4. A wheel and chassis assembly for vehicles of the character indicated, comprising a chassis structure including relatively spaced longitudinal frame members, ground wheels pivotally connected to said frame members, yieldable members arranged substantially longitudinally of the chassis and each connected to one of the frame members and one of said ground wheels, auxiliary frame means having pivotal connection with said frame members, said auxiliary frame means providing portions in engagement with said yieldable members and portions extending between said frame members and oppositely toward the opposite ends of the chassis, and ground wheels carried by the last said portions of the auxiliary frame means.

5. A wheel and chassis assembly for vehicles of the character indicated, comprising a chassis structure including spaced apart longitudinal frame members, ground wheels each independently pivotally connected to one of said frame members, relative long spring members each connected near its ends, to one of said frame members and the ground wheel pivoted thereto, a pair of auxiliary frames arranged longitudinally between said frame members and each having a terminal end adjacent one end of the chassis, each of said auxiliary frames being pivotally connected to said frame members and providing extensions in engagement with said spring members intermediate the ends of the latter, and a ground wheel supported at the terminal end of each of said auxiliary frames.

6. A wheel and frame assembly for vehicles of the character indicated, comprising a body frame including spaced apart longitudinal frame members, ground wheels arranged in relatively spaced positions transversely of the body frame and each pivotally connected to one of said frame members, resilient members connected between said ground wheels and said frame members, ground wheels one near each end of the body frame and located substantially in alignment with the longitudinal axis of the body frame, and supporting means for the last said ground wheels, comprising wheel frames each in operative connection with said frame members and said resilient members.

7. In a wheel and frame assembly for road vehicles, a body frame, ground wheels one near each end of the frame, ground wheels one adjacent each side of the frame and connected thereto, the last said ground wheels being disposed lengthwise of the body frame between the center and one end of the latter, and means including auxiliary frames supporting the first said ground wheels and pivoted to said body frame, structurally interconnecting said ground wheels in a manner to determine substantially equal effective wheel spans between one of the first said ground wheels and each of the second said ground wheels and between the other of the first said ground wheels and each of the second said ground wheels.

8. In a road vehicle, a body frame extending longitudinally of the vehicle, a first pair of ground wheels relatively spaced transversely of the frame, supports for said ground wheels, pivotally connected to said body frame and locating the wheels longitudinally of the frame, between the transverse center of the frame and one end thereof, a second pair of ground wheels one located near each end of the body frame and substantially in alignment with the longitudinal axis of the latter, and means including wheel-carriage members for said second pair of ground wheels, interconnecting the first and second pairs of ground wheels such as to determine effective wheel spans of substantially equal length, between each of the first pair of ground wheels and each of the second pair of ground wheels, said wheel-carriage members being connected to said body frame at points of said members which are substantially mid-way of the wheel spans.

9. In a road vehicle of the character indicated, a vehicle body frame including relatively spaced longitudinal frame members, vehicle drive wheels relatively spaced transversely of the body frame and connected to said frame members, yieldable members between said drive wheels and frame members, an auxiliary frame pivoted to said frame members and bearing against said yieldable members, said auxiliary frame extending longitudinally of the body frame and having a terminal end near one end of the latter, a ground wheel supported at the terminal end of the auxiliary frame and angularly movable for vehicle steering, a second auxiliary frame pivoted to said frame members and bearing against said yieldable members, and a ground wheel supported by said second auxiliary frame.

10. In a road vehicle as defined by claim 9, wherein said vehicle steering ground wheel and the last said ground wheel are disposed substantially in alignment with the longitudinal axis of the body frame.

11. In a road vehicle as defined by claim 9, wherein said auxiliary frames extend longitudinally between said body frame members, and the second auxiliary frame supports the second ground wheel adjacent the opposite end of the body frame, and wherein said drive wheels are located with respect to the longitudinal extent of the body frame, between the center and one end of the latter frame.

12. In a road vehicle of the character indicated, a vehicle body frame including relatively spaced longitudinal frame members, vehicle ground wheels relatively spaced transversely of the body frame and pivotally connected to said frame members, said wheels being located with respect to the longitudinal extent of the body frame, between the center and one end of the latter frame, relatively long spring members arranged along said frame members and each having one end connected to the adjacent frame member, the opposite ends of said spring members being connected to said ground wheels, an auxiliary frame extending longitudinally between said body frame members and providing a terminal end adjacent one end of the body frame, said auxiliary frame being pivoted to said frame members intermediate the ends of the latter and providing extensions bearing against said spring members, a ground wheel supported at the terminal end of said auxiliary frame and angularly movable for vehicle steering, a second auxiliary frame pivoted to said body frame members intermediate the ends of the latter, extending longitudinally between said frame members and providing a terminal end near the opposite end of the body frame, said second auxiliary frame providing extensions bearing against said spring members, and a ground wheel supported at the terminal end of said second auxiliary frame.

13. In a road vehicle as defined by claim 12, wherein the extensions of said auxiliary frames engage and bear upon said spring members in zones thereof substantially midway of the ends of the spring members.

14. In a road vehicle as defined by claim 12, wherein said ground wheels supported by the auxiliary frames, are arranged substantially in alignment with the longitudinal axis of the body frame, and wherein the first said ground wheels are located with respect to the longitudinal extent of the body frame, between the center of said body frame and the end thereof near which is located the ground wheel supported by said second auxiliary frame.

15. In a road vehicle, a body frame, ground wheels connected to said frame intermediate the ends thereof, ground wheels one near each end of the frame, and frame-connected wheel supports for said last named ground wheels, located substantially in the longitudinal axis of the frame, each of said wheel supports including a vertical shaft having a lower wheel supporting end projecting laterally from the axis of the vertical shaft to permit angular displacement of the wheel with respect to said longitudinal frame axis, the wheel supporting end on the shaft of one support projecting to a greater extent than the corresponding wheel supporting end on the shaft of the other support, thereby affording displacement of its wheel laterally of the longitudinal vehicle axis in vehicle turning, greater than the lateral wheel displacement afforded by the other support.

CHARLES I. PLACE.

REFERENCES CITED

The following references are of record in the file of this patent:

UNITED STATES PATENTS

| Number | Name | Date |
| --- | --- | --- |
| 853,091 | Klinge | May 7, 1907 |
| 1,426,975 | Fuscaldo | Aug. 22, 1922 |
| 2,067,546 | Rocher | Jan. 12, 1937 |